United States Patent Office 3,177,049
Patented Apr. 6, 1965

3,177,049
ANTHRAQUINONE DYE MIXTURE AND
WOOL DYEING THEREWITH
Albert Job and Roland Heinz, Leverkusen, Germany, assignors to Farbenfabriken Bayer Aktiengesellschaft, Leverkusen, Germany, a German corporation
No Drawing. Filed June 27, 1962, Ser. No. 205,547
Claims priority, application Germany, July 11, 1961, F 34,401
5 Claims. (Cl. 8—25)

This invention relates to a new dyestuff mixture.

The sulphonic acids of the arylamino anthraquinones are used to an increasing degree for the dyeing of wool. These dyestuffs are generally employed for dyeing with addition of acids, such as sulphuric acid, acetic acid or formic acid since, without addition of acids they draw only partly from the dyeing bath on the animal fibre. It is, however, known that wool is strongly affected by the hot acids, so that those dyestuffs which can be used from a neutral bath are gaining an ever increasing importance. It has been ascertained that the neutral affinity for the fibre increases with the decrease of the sulphonic acid group-content of the aryl-amino anthraquinones. On the other hand, the water-solubility is reduced by the lack of sulphonic acid groups. The water-solubility is of great importance for the dyeing process. It is therefore the endeavour of the industry to produce dyestuffs of that kind which are not only neutral dyes but also show a sufficient solubility in water.

By introducing two sulphonic acid groups into 1,4-di-p-toluido anthraquinone a wool dyestuff of good solubility is obtained. However, it dyes only slightly wool from a neutral bath. By introducing 1–1½ sulphonic acid groups into the molecule a neutrally drawing dyestuff is obtained, but the water-solubility of the dyestuff is small.

It is an object of the present invention to provide a new dyestuff mixture. A further object is to provide a new neutrally dyeing anthraquinone dyestuff. Other objects will appear hereinafter.

It has now been found that the 1,4-di-p-toluido anthraquinone is obtained in a well water-soluble form and dyeing from a neutral bath, if the dyestuff molecule contains an average of about 1–1½ sulphonic acid groups and is used in a mixture with small quantities of a sulphonic acid group-containing 1,4-di-(p-cyclohexyl-phenylamino)-anthraquinone.

The dyestuff mixture used according to the invention can be prepared by simultaneously sulphonating a mixture of 1,4-di-p-toluido-anthraquinone and 1,4-di-(p-cyclohexyl)-phenylamino)-anthraquinone, until an average of about 1–1½ sulphonic acid groups are introduced into the dyestuff molecules. The dyestuff mixture can, however, also be obtained by subsequent mixing of the two single dyestuffs which contain an average of about 1–1½ sulphonic acid groups each. However, a joint sulphonation of the dyestuff mixture is preferably carried out, since in this way products with better properties are obtained by the more thorough mixing process.

It is generally sufficient that the 1,4-di-(p-cyclohexyl-phenylamino)-anthraquinone is contained in the mixture in quantities of up to 15% by weight, preferably 2–10% by weight.

The dyestuff mixture employed according to the invention possesses a water-solubility of 80–100 g. per litre. This good water-solubility is surprising since the two single components, at the same degree of sulphonation, have a considerably poorer water-solubility. The sulphonated 1,4-di-p-toluido-anthraquinone has a solubility of only 20–30 g. per litre. The sulphonated 1,4-di-(p-cyclohexyl-phenylamino)-anthraquinone is even practically insoluble in water.

The following example is given for the purpose of illustrating the invention.

Example 95 parts by weight of 1,4-di-p-toluido anthraquinone and 5 parts by weight of 1,4-di-(p-cyclohexyl-phenylamino)-anthraquinone are dissolved in 400 parts by weight of monohydrate and so much 20% oleum is added gradually until the color of solution in 96% sulphuric acid has changed from violet to green-blue. The product is worked up in 3000 parts by weight of a 7.5% solution of sodium chloride, filtered and washed with a 7.5% sodium chloride solution until the product is free of acid.

After drying, up to 100 g. of the dyestuff so obtained dissolve in one litre of hard water, it dyes from a neutral bath a deep bluish-green shade. The dyestuff molecules contain an average of 1–1½ sulphonic acid groups.

We claim:

1. Neutrally dyeing anthraquinone dyestuff preparation consisting essentially of a mixture of 1,4-di-p-toluido anthraquinone with an active amount of 1,4-di-(p-cyclohexyl-phenylamino)-anthraquinone, the mixture containing an average of about 1–1½ sulphonic acid groups.

2. Dyestuff preparation according to claim 1, containing 2–10% by weight of 1,4-di-(p-cyclohexyl-phenyl-amino)-anthraquinone.

3. Process for the production of the dyestuff according to claim 1, which comprises sulphonating a mixture of 1,4-di-p-toluido-anthraquinone and 1,4-di-(p-cyclohexyl-phenylamino)-anthraquinone until an average of about 1–1½ sulphonic acid groups per molecule of dyestuff is attained.

4. A dyestuff preparation containing as active ingredient, a mixture of components consisting of 1,4-di-p-toluido anthraquinone and up to 15% by weight of 1,4-di-(p-cyclohexyl-phenylamino)-anthraquinone, the components containing an average of about 1–1½ sulfonic acid groups.

5. A process for dyeing wool from a substantially neutral anthraquinone dyebath, comprising contacting the wool with an active amount of a preparation consisting essentially of a dyestuff mixture of 1,4-di-p-toluido anthraquinone with up to 15% by weight of 1,4-di-(p-cyclohexyl-phenylamino)-anthraquinone, the dyestuff mixture containing an average of about 1–1½ sulfonic acid groups.

References Cited by the Examiner
UNITED STATES PATENTS
2,060,186   11/36   Felix _____ 8—25 X

OTHER REFERENCES

Lubs: The Chemistry of Synthetic Dyes and Pigments, pp. 404–406, Pub. 1955 by Reinhold Publishing Corporation.

Colour Index, 2nd Ed., vol. 2, pg. 3498, 1957, Pub. by The Society of Dyers and Colourists, London, England, 1956.

NORMAN G. TORCHIN, *Primary Examiner.*
MORRIS O. WOLK, *Examiner.*